April 5, 1966  J. W. GRIGSBY  3,244,433
TRACTOR STEP ATTACHMENT
Filed Sept. 25, 1964
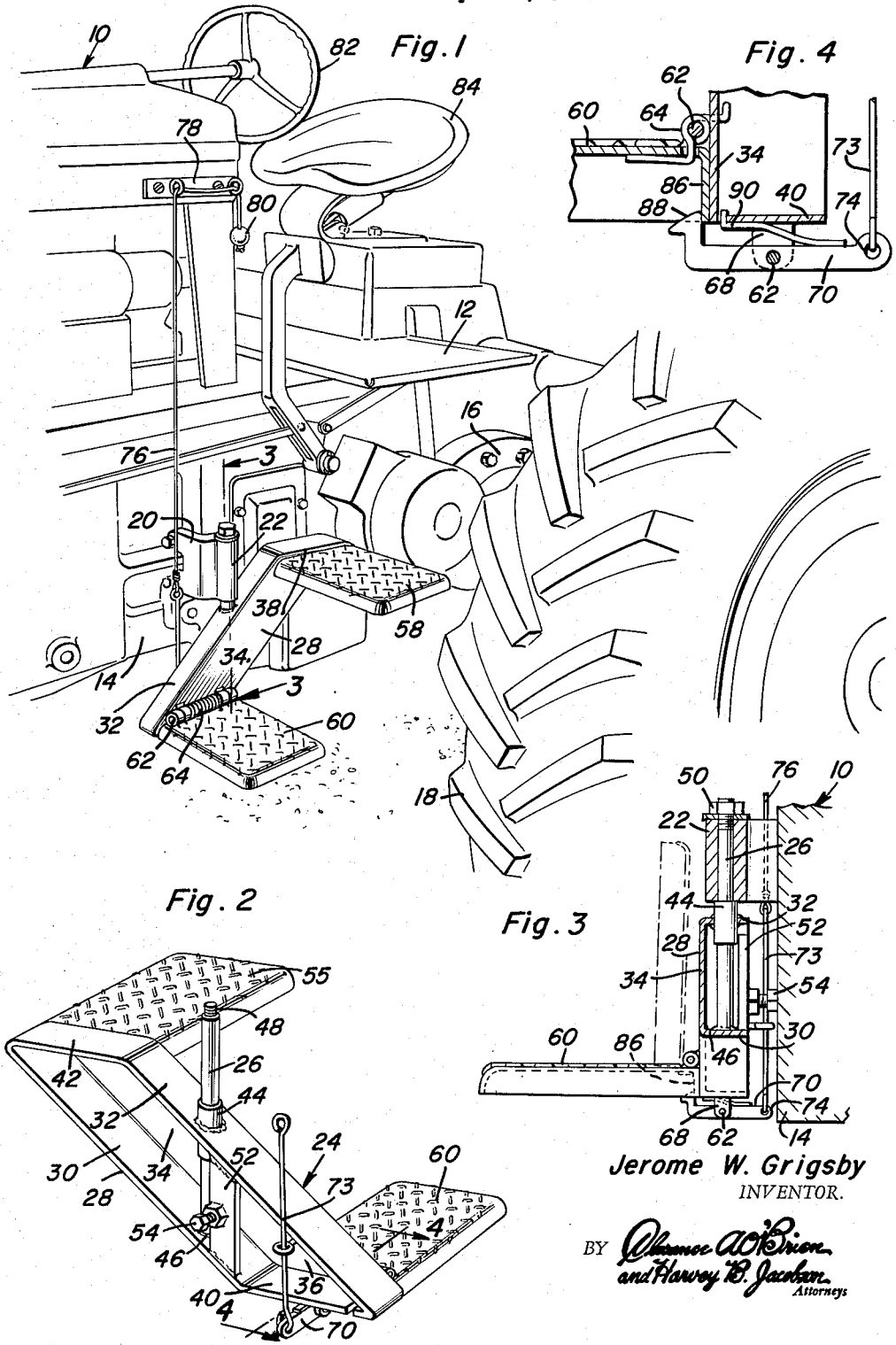
Jerome W. Grigsby
INVENTOR.

United States Patent Office 3,244,433
Patented Apr. 5, 1966

3,244,433
TRACTOR STEP ATTACHMENT
Jerome W. Grigsby, R.F.D. 2, Aurora, Nebr.
Filed Sept. 25, 1964, Ser. No. 399,297
10 Claims. (Cl. 280—163)

This invention relates to a novel and useful tractor step attachment and more specifically to an attachment adapted to be secured to the transmission housing or other adjacent portion of a tractor disposed inboard of one of the rear wheels of the tractor and also adjacent the operator's platform. The tractor attachment of the instant invention comprises a step structure including at least one low generally horizontally disposed tread portion which is swingably supported for rotation about a generally horizontally disposed axis. The tractor step attachment is adapted to be mounted from the associated tractor in a manner such that the tread portion extends transversely of the tractor and that the axis of rotation of the tread portion extends longitudinally of the tractor and transversely of the tread portion. In this manner, when the tread portion of the attachment is in a raised inoperative position, the tread portion will be disposed in an upstanding plane extending longitudinally of the associated tractor.

The step attachment includes an upstanding side rail from which the tread portion is pivotally supported. The tread portion projects outwardly from one side of the side rail, the latter being adapted to be supported from the associated tractor with the side rail disposed in an upstanding plane extending longitudinally of the tractor, and in this manner the generally horizontally disposed tread portion may be swung about its axis of rotation relative to the side rail in order that the tread portion substantially parallels the side rail. In this manner, with the tread portion of the step attachment pivoted to its retracted position the step attachment will offer a minimum of frontal area for engagement with any rows of crops which may be disposed between the rear wheels of the associated tractor.

The tractor step attachment of the instant invention has as its main object to provide a convenient manner in which the operator's platform of a tractor may be mounted.

A further object of this invention, in accordance with the immediately preceding object, is to provide a tractor step attachment adapted to be supported between the main frame portion or transmission of the tractor and one of the rear driving wheels of the tractor whereby the step attachment may be approached from a position disposed forwardly of the operator's platform and utilized to mount the latter thereby doing away with the necessity of the operator of the tractor having to mount the operaor's platform thereof from the rear in the conventional manner, which mode of mounting is sometimes made difficult by the existence of earthworking equipment operatively connected to and disposed behind the associated tractor.

Yet a further object of this invention is to provide a tractor step in accordance with the preceding objects and including a laterally outwardly projecting tread portion swingable about a horizontal axis extending longitudinally of the associated tractor.

A further object of this invention, in accordance with the immediately preceding object, is to provide means for yieldingly urging the tread portion of the step attachment to a vertically disposed retracted position.

Yet another object of this invention is to provide a tractor step attachment including means for releasably retaining the tread portion thereof in a substantially horizontally disposed position.

A final object of this invention to be specifically enumerated herein is to provide a tractor step attachment in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of a conventional form of farm tractor shown with the tractor step attachment of the instant invention operatively mounted thereon;

FIGURE 2 is a perspective view of the tractor step attachment;

FIGURE 3 is an enlarged fragmentary vertical sectional view taken substantially upon the plane indicated by the section line 3—3 of FIGURE 1; and FIGURE 4 is a further enlarged fragmentary sectional view of the tractor step attachment more clearly showing the releasable latch means for retaining the lower tread portion of the attachment in the horizontally disposed operative position.

Referring now more specifically to the drawings, the numeral 10 generally designates a conventional form of farm tractor including an operator's platform 12 and a transmission housing 14 from which a pair of opposite side axle assemblies 16 are supported and which rotatably journal a pair of rear wheel assemblies 18.

The tractor 10 includes a mounting bracket 20 which projects laterally outwardly of the transmission housing 14 toward the left rear wheel assembly 18. The mounting bracket 20 includes an upstanding outer sleeve portion 22 and it may be seen that the tractor step attachment of the instant invention which is generally referred to by the reference numeral 24 includes an upstanding shank portion 26 which is rotatably receivable in the sleeve portion 22.

The tractor step attachment 24 of the instant invention includes an inclined generally channel-shaped side rail 28 including a pair of generally parallel flanges 30 and 32 interconnected by means of an upstanding bight portion 34. The opposite ends of the bight portion 34 are bevelled as at 36 and 38 and the flanges 30 and 32 include angulated remote end portions 40 and 42 which project toward the opposite flange and generally parallel the tapered portions or edges 36 and 38, respectively. The angulated end portions 40 and 42 are of course secured to the bevelled end portions 36 and 38 of the bight portion 34 and it may be seen from FIGURE 2 of the drawings that the flange 32 has a sleeve 44 secured therethrough. The shank portion 26 extends through sleeve 44 and may be secured to the latter in any convienient manner. In addition, the lower end of the shank portion 26 is secured to the flange 30 in any convenient manner as at 46.

The upper end of the shank portion 26 includes a diametrically reduced threaded end portion 48 and it may be seen from FIGURES 1 and 3 of the drawings that a threaded fastener 50 may be secured to the diametrically reduced externally threaded end portion 48 for the purpose of securing the shank portion 26 through the sleeve portion 22 with the upper end of the sleeve 44 abutting against the lower end of the sleeve portion 22. In this manner, the tractor step attachment 24 may be secured to the mounting bracket 20 in adjusted rotated positions. Still further, from FIGURE 2 of the drawings it may be seen that a brace member 52 extends between the flanges 30 and 32 and that the brace member 52 includes a laterally outwardly adjustable abutment 54. The abutment 54 may be laterally adjusted relative to the bight portion 34 so as to abuttingly engage the transmission housing 14 for the purpose of steadying the attachment 24.

The upper end of the bight portion 34 has an upper tread member or portion 58 secured thereto and it may be seen that the tread portion 58 projects laterally outwardly away from the bight portion 34 in a direction opposite to the direction in which the flanges 30 and 32 project. Further, the lower end of the bight portion 34 includes a lower tread portion 60 which is pivotally supported from the bight portion 34 by means of a hinge assembly 62. The hinge assembly 62 includes a torsion spring 64 interconnected between the tread portion 60 and the bight portion 34 as seen to best advantage in FIGURE 4 of the drawings and the torsion spring 64 yieldingly urges the tread portion 60 to the inoperative position illustrated in phantom lines in FIGURE 3 of the drawings. However, the angulated end portion 40 includes a pair of generally parallel apertured ears 68 between which a latching lever 70 is pivotally supported by means of a pivot pin 72. One end of the latching lever 70 has an end of a pull member 73 secured thereto as at 74 and the other end of the pull member 73 has a flexible pull string 76 secured thereto, the pull string 76 being slidably received through a guide assembly 78 and including a free end portion 80 disposed adjacent the steering wheel 82 and operator's seat 84 of the tractor 10.

When it is desired to swing the tread portion 60 from the inoperative position illustrated in phantom lines in FIGURE 3 of the drawings to the solid line position illustrated in FIGURE 3 of the drawings, it is merely necessary to grasp the upper end of the tread portion 60 swinging it downwardly and outwardly away from the bight portion 34 whereupon the depending inner flange 86 of the tread portion 60 will engage the cam surface 88 of the lever 70 and pivot the latter out of the way until the tread portion 60 is disposed in its operative position, at which time the lever 70 will be urged into engagement with the flange portion 86 by means of spring 90 so as to retain the tread or step portion 60 in the operative position. Of course, when it is desired to raise the tread portion 60, it is merely necessary to pull on the pull string 76 in order that the lever 70 will be pivoted out of engagement with the flange portion 86 and the spring 64 will swing the tread portion 60 to the inoperative position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tractor step attachment comprising a step assembly, said step assembly including an upstanding shank portion and means defining a horizontally enlarged abutment on a lower end portion of said shank, the upper end of said shank including means adapted to have a thrust fastener secured thereto, whereby said shank is adapted to be passed upwardly through an upstanding sleeve supported from a tractor and to be secured through said sleeve by means of said fastener with said sleeve clamped between said fastener and said abutment.

2. The combination of claim 1 including a mounting sleeve comprising the first mentioned sleeve and including a laterally outwardly apertured mounting flange adapted to be secured to the transmission housing of a tractor inwardly of one of the rear wheels of the tractor and forwardly of the driver's position thereon.

3. In combination with a tractor including an upstanding laterally outwardly projecting sleeve supported from the transmission housing of said tractor, a tractor step attachment comprising a step assembly, said assembly including a shank portion and means defining a horizontally enlarged abutment on a lower end portion of said shank, the upper end portion of said shank being threaded and passed upwardly through said sleeve, a threaded fastener threadedly engaged with said upper end portion of said shank and clampingly gripping said sleeve between said abutment and said fastener.

4. The combination of claim 3 including outwardly projecting abutment means carried by said step assembly and adjustable laterally of said shank and having its outer end abuttingly engaged with said transmission housing.

5. The combination of claim 1 wherein said step assembly includes an inclined elongated channel member including a substantially vertical web portion interconnecting a pair of generally parallel upper and lower flanges disposed at generally right angles relative to said web portion, said shank being secured through said upper flange and secured to said lower flange, and a plurality of generally horizontal step treads secured to and projecting laterally outwardly of said web portion away from said flanges and at points spaced longitudinally along said channel member.

6. The combination of claim 1 wherein said step assembly includes an upstanding side from which said shank portion is supported, said side including at least one generally horizontal step tread which projects laterally outwardly from one side of said upstanding side.

7. The combination of claim 6 wherein said shank portion is disposed on the side of said upstanding side remote from said step tread.

8. The combination of claim 6 wherein said step assembly includes an upstanding side for which said shank portion is supported, said side including at least one generally horizontal step tread which projects laterally outwardly from one side of said upstanding side, said step tread being pivotally supported from said upstanding side for swinging movement from its horizontal position toward an upstanding retracted position closely adjacent and generally paralleling said upstanding side.

9. The combination of claim 8 including means connected between said upstanding side and said step tread yieldingly urging said tread toward said retracted position.

10. The combination of claim 9 including latch means carried by said upstanding side and engaged with said tread releasably retaining said step tread in its operative horizontal position.

References Cited by the Examiner

UNITED STATES PATENTS

| | | | |
|---|---|---|---|
| 438,021 | 10/1890 | Robbins | 280—166 |
| 1,141,017 | 5/1915 | Smith | 280—165 |
| 1,953,298 | 4/1934 | Goodwin | 280—166 X |
| 2,702,195 | 2/1955 | Merrill | 182—89 |
| 2,951,454 | 9/1960 | Candlin | 280—166 X |
| 3,068,958 | 12/1962 | McCann | 182—89 |

BENJAMIN HERSH, *Primary Examiner.*

W. A. MARCONTELL, *Assistant Examiner.*